Patented May 11, 1937

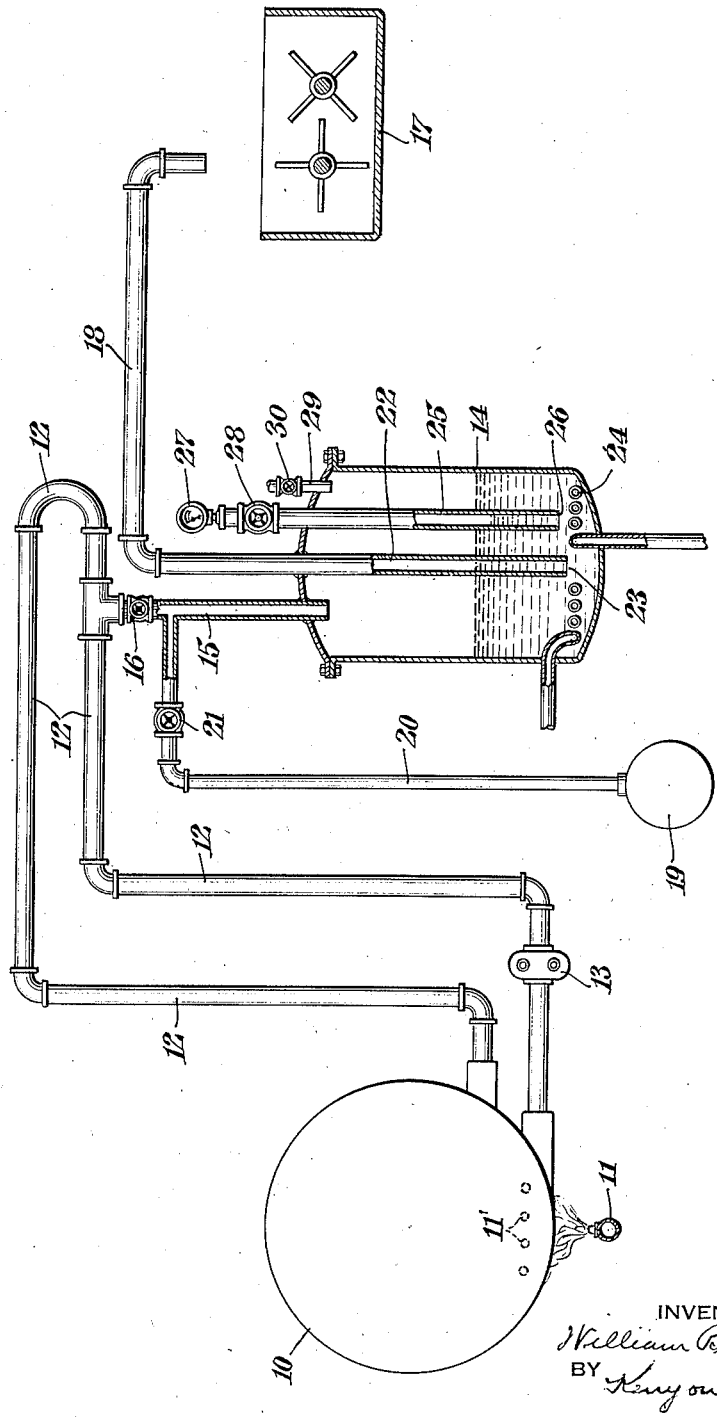

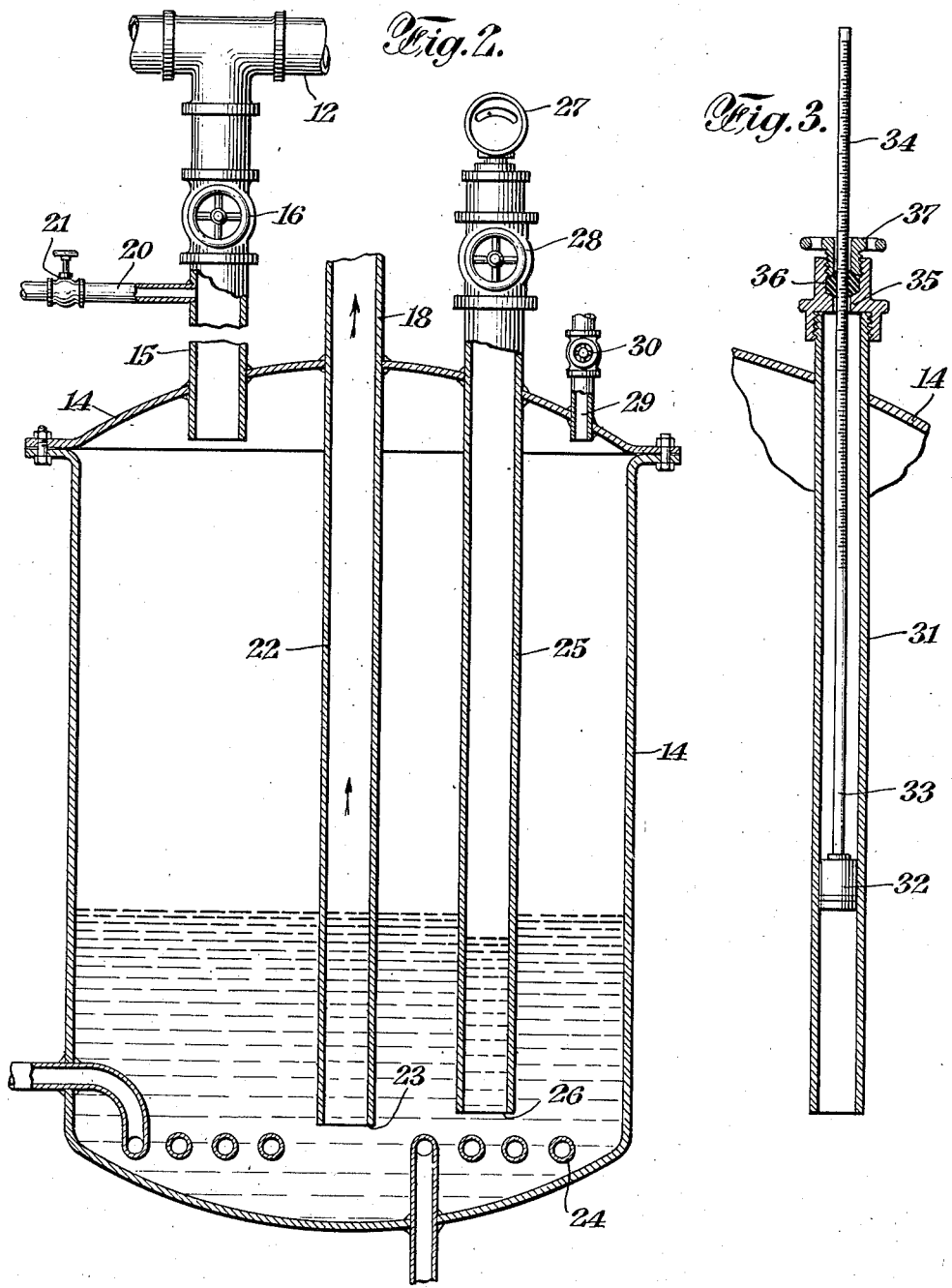

2,079,898

UNITED STATES PATENT OFFICE 2,079,898

DISPENSING AND MEASURING APPARATUS

William Burchenal, Glendale, Ohio, assignor to The Philip Carey Manufacturing Company, a corporation of Ohio Application April 10, 1934, Serial No. 719,845

6 Claims. (Cl. 221—100)

This invention relates to apparatus for dispensing melted bituminous materials. It relates particularly to apparatus for dispensing predetermined quantities of melted bituminous materials for use in the manufacture of bitumen containing compositions such as asphalt planking and the like.

Heretofore difficulty has been encountered in conveniently dispensing and measuring melted bituminous materials. Weighing devices and the like which have been used heretofore, have been found to be inconvenient to handle and to become coated with solidified bitumen with resultant inaccuracy of results and soiling of the operator.

It is a purpose of this invention to provide means for conveniently, quickly, and accurately measuring a quantity of melted asphalt, for example, and dispensing the same into a mixer, for example. It is a further purpose of this invention to provide means whereby a measured quantity of melted bituminous material may be dispensed as desired without danger of solidification of bituminous material causing clogging of the lines through which the bituminous material is passed.

Features of this apparatus embodying this invention include means for introducing asphalt as in a melted condition into a tank, means for heating the asphalt in the tank and means for determining the level of melted asphalt in said tank and for withdrawing the portion of asphalt in the tank above a predetermined level so that the volume of melted asphalt removed from the tank can be known. A further feature of this invention resides in the provision of suitable means for determining directly the volume of melted bitumen in the tank which can be expelled from the tank through an outlet line.

It is also a feature of this invention that a measuring tank is provided in combination with a reservoir for melted bituminous material and that means for introducing melted bituminous material into the measuring tank are afforded which inhibit clogging of lines. Thus the valve in the line between the reservoir and the tank is positioned so that on the reservoir side thereof the bitumen will be maintained in a melted condition as by maintaining a circulation of melted bitumen in a continuous line emanating from and returning to said reservoir. Moreover, in the line on the side of the valve toward the tank means for keeping the line clear are afforded such as making the line vertical and of large diameter. Compressed air inlet and generating means adapted to eject bituminous material from this portion of the line by a current of air may also be employed according to this invention to keep this portion of the line clear.

Further features of this invention reside in the provision of heating means positioned in the tank below a predetermined level of liquid in the tank which is always retained in the tank. With the discharge line of the measuring and dispensing apparatus means are used for cleaning the same after the apparatus has been used and for preventing the building up of a deposit therein. Thus according to this invention the apparatus is such that it can readily be kept clean. Moreover, the apparatus can be filled at any time and can be discharged at any time without any part of the apparatus becoming clogged with solidified bitumen and without soiling of the operator.

Further features of this invention relate to means for discharging melted bitumen from the measuring tank so that the volume of discharged bitumen is known. To this end the tank is provided with an outlet through which a volume of melted bitumen above a predetermined level in the tank may be discharged by air pressure built up within the tank by suitable means together with means for determining the difference in levels of melted bitumen in the tank before and after the volume of bitumen has thus been discharged from the tank.

In a preferred embodiment of this invention the volume of material is determined by means of a tube or other hollow body inserted downwardly into melted bitumen in the tank and by providing the tube with suitable pressure recording devices adapted to record increase of pressure within the hollow body when the level of melted bituminous material rises within the tank. Thus means are provided for determining the quantity of melted bitumen within the tank above a predetermined level. The air pressure recording device is preferably used with a valve for cutting the same off from the air in the hollow body when melted bituminous material is discharged from the tank by compressed air. Alternatively a suitable float and recording device calibrated to determine the level of melted bitumen within the tank and means for sealing the opening in the tank through which the recording device passes, so that air pressure may discharge melted bitumen through the discharge line from the tank, may be used.

Further features of this invention reside in inserting the outlet line of the measuring tank downwardly into the measuring tank so that melted bituminous material can be ejected therethrough until the level of melted bituminous material in the measuring tank corresponds to the level of the mouth of the lower end of said line. Upon ejecting melted bituminous material from the tank by means of air pressure the melted bituminous material above the level of the end or mouth of outlet line will be forced out first and will be followed by a sudden flow of air through the outlet line which tends to clean the same so that the full quantity of measured bituminous material is ejected into a mixing apparatus, for example, and so that the line will not become clogged upon the cooling of any bituminous material remaining therein.

While this invention may be embodied in several different types of apparatus it will be described here for purposes of illustration in connection with the accompanying drawings, wherein Fig. 1 is a diagrammatic representation of one form of apparatus for dispensing and measuring melted bituminous material according to this invention;

Fig. 2 is a front view principally in section of the measuring and dispensing tank of the apparatus embodying this invention; and Fig. 3 is a front fragmentary view partly in section of alternate means for determining the level of melted bitumen in the dispensing and measuring tank.

In the drawings above referred to, a reservoir 10 is adapted to contain melted bituminous material. Any suitable heating means such as burners 11 may be employed to maintain the bituminous material in the reservoir 10 in a melted condition. Alternatively internal heating means such as a heating coil 11' can be used instead of external heating means in connection with the reservoir. Melted bituminous material is maintained in circulation through the line 12, which emanates from and returns to the reservoir 10, by means of a suitable pump 13.

Melted bituminous material maintained in circulation in the line 12 is drawn off as desired into the dispensing and measuring tank 14 by means of a line 15 controlled by a valve 16. The valve 16 is preferably positioned in close proximity to the line 12 so that the bituminous material adjacent the valve will be maintained in a melted condition due to circulation of melted bituminous material in line 12 and will be prevented from becoming solidified by cooling. The line 15 is preferably made as quite short and is preferably of relatively large diameter and vertically extending so that melted bituminous material will not remain therein so as to clog in the line 15 after the valve 16 has been closed.

Melted bituminous material in tank 14 is dispensed to a mixer 17, for example, by means of the outlet pipe or line 18. The outlet line 18 preferably has a portion 22 extending downwardly into the tank 14 to a point near the bottom thereof. The portion 22 is imperforate within the tank 14 except for a mouth 23 adjacent the lower end thereof so that melted bituminous material in the tank 14 may be expelled through the outlet line 18 by exerting superatmospheric pressure on the melted bituminous material within the tank 14. The melted bituminous material in the tank 14 is expelled under air pressure down to a level within the tank determined by the position of the mouth 23 of the outlet pipe.

To supply superatmospheric pressure for expelling melted bituminous material from the tank 14, compressed air, for example, may be introduced into the tank 14 from any suitable source 19 of air under pressure through line 20 controlled by valve 21. The line 20 preferably opens into line 15 and preferably also opens into the line 15 adjacent the valve 16. This arrangement is advantageous in the normal operation of the measuring tank because when compressed air from source 19 is admitted into the tank 14, the flow of compressed air through line 15 after the valve 16 has been closed, tends to remove any melted bituminous material from line 15. Thus, danger of melted bituminous material in line 15 cooling and solidifying so as to clog line 15 is removed.

Within the tank 14 and preferably below the level of the mouth 23 of portion 22 of outlet pipe 18 is positioned a heating unit such as heating coil 24. The heating coil can be heated by any suitable heating medium such as steam. The heating coil 24 enables the operator of the apparatus to maintain the bituminous material in tank 14 in a melted condition for an indefinite period of time. Moreover, after melted bituminous material has been discharged from the tank the residue remaining therein can be maintained in a melted condition so as to prevent solidification thereof.

Extending downwardly into the tank 14 is a hollow member or tube 25 which has an opening 26 adjacent the lowermost end thereof. The opening 26 is preferably at about the same level in the tank 14 as the opening 23 of the outlet pipe. At the upper end of the tube 25 is a pressure-recording instrument 27. Pressure-recording instruments of a mechanical or hydrostatic type are well-known in the art. The purpose of the pressure-recording instrument 27 is to record the increase of pressure that is occasioned within tube 25 when melted bituminous material is introduced into the tank 14. As the tank 14 is filled the pressure of the atmosphere above the melted bituminous material in the tube 25 increases. This increase of pressure is recordable on the instrument 27. The instrument 27 can be calibrated so as to show the volume of melted bituminous material in tank 14 above the level in tank 14 of the mouth 23 of the outlet pipe. Between the instrument 27 and the interior of hollow tube 25 there is a valve 28 which is adapted to shut off the pressure instrument from the interior of tube 25 as desired.

In order that the tank may be the more conveniently filled a suitable vent 29 controlled by valve 30 is provided.

An alternate form of measuring device is shown in Figure 3 and consists of a tube 31 extending downwardly into the tank 14. The tube acts as a guide for guiding a float 32 and rod 33 in a longitudinal direction. The rod 33 has calibrations 34 thereon and passes through the aperture 35 at the end of the tube. The function of the float and rod is to record the level of melted bituminous material in tank 14. The calibrations 34 may be of such character as to record the volume of the portion of melted bituminous material in tank 14 above the level of mouth 23 of the outlet pipe and be read against any suitable sighting part. In order to afford means for making an air-tight seal between the rod 33 and the tube 31 a packing gasket 36 is provided with a compressor screw 37 adapted to compress or clamp the gasket 36 against the edges of rod 33. When the gasket is thus compressed, no air or melted bituminous material can escape from tank 14 past the rod 33. The rod 33 can be unclamped and rendered free to reciprocate by loosening the compression screw 37 so as to permit the gasket 36 to expand. If it is desired, both the rod and float can be removed entirely from the tube 31 after the tank 14 has been filled with a desired quantity of melted bituminous material and the tube 31 can be covered with an imperforate cap to prevent the escape of air and melted bituminous material from the tube 31.

While the operation of apparatus embodying this invention is apparent, it will be described briefly as follows:

Bituminous material is maintained in a melted condition in reservoir 10 and is circulated through line 12 by pump 13. To transfer a desired measured quantity of melted bituminous material to the mixer 17, for example, the valve 16 in line 15 is opened allowing melted bituminous material to flow into tank 14. The operator meanwhile observes the pressure indicator 27 shown in Fig. 2 or the calibrated rod shown in Figure 3 and closes the valve 16 when either of these recording devices or any equivalent device shows that the tank 14 contains a volume of melted bituminous material above the level in the tank 14 of the mouth 23 of the outlet pipe, which corresponds to the desired quantity that is to be dispensed into mixer 17. After the desired quantity of bituminous material has been introduced into the tank 14, the bituminous material is kept in a melted condition by the heating coil 24 until it is desired to transfer the material to the mixer. When it is desired to transfer the melted bituminous material to the mixer 17, the valve 28 shown in Figure 2 is closed so as to prevent the pressure-recording instrument 27 from being subjected to the high air pressure necessary to expel the melted bituminous material in tank 14 through the outlet pipe 18. Moreover, any outlets to the tank excepting only the outlet pipe 18 are closed. Thus, the valve 30 in vent 29 is closed. Moreover, the packing 36 shown in Figure 3 is compressed so as to make an air-tight joint between the packing and the rod 33 when this alternate form of measuring device is used. Air under superatmospheric pressure may now be admitted from line 20 by opening valve 21. The inrushing air serves to clear any melted bituminous material from the line 15 and at the same time forces the portion of melted bituminous material in tank 14 above the mouth 23 of the outlet pipe through the outlet pipe 18 and to mixer 17. The amount of bituminous material which is thus expelled is that which has been measured by the recording device as above explained, and is the amount desired for addition to the mixer 17. After the bituminous material has been expelled through the outlet line 18, the compressed air in the tank 14 likewise rushes out through the outlet pipe 18 and serves to clear this pipe of bituminous material. By thus clearing the line 18 of bituminous material substantially all of the measured quantity of melted bituminous material is transferred to mixer 17 so that there is little loss of material during transfer and so that very little bituminous material remains in the outlet pipe 18. Moreover, upon passing a subsequent charge of hot melted bituminous material through the outlet pipe 18 any small amount of bituminous material remaining therein will be melted and passed over to the mixer 17 so as to prevent any gradual building up of solidified bituminous material in the outlet pipe 18.

While this invention has been described in connection with the dispensing and measuring of melted bituminous material, the apparatus of this invention can also be used in handling fluids analogous in character to melted bituminous material. Moreover, while this invention has been described in connection with certain specific embodiments thereof it is to be understood that this has been done merely for the purpose of illustration.

I claim:

1. Apparatus for dispensing and measuring melted bituminous material which comprises a reservoir adapted to maintain bituminous material in a melted condition, a continuous line for taking off melted bituminous material from said reservoir and returning same to said reservoir, means for circulating melted bituminous material through said line, a tank, by-pass means for introducing melted bituminous material from said line into said tank, valve means adapted to establish and disestablish communication by said by-pass means between said continuous line and said tank, means for dispensing responsive to air under pressure from said tank the portion of melted bituminous material above a predetermined level in said tank, and means for indicating the quantity of melted bituminous material introduced into said tank above said predetermined level from said reservoir.

2. Apparatus for dispensing and measuring melted bituminous material which comprises a reservoir adapted to maintain bituminous material in a melted condition, a tank, a line between said reservoir and said tank, a valve in said line, means for maintaining the bitumen in said line on the side of said valve adjacent said reservoir in a heated and melted condition, an air inlet into said line adjacent said valve and on the side of said valve toward said tank, and means for introducing air into said line through said inlet so as to free the portion of said line between said air inlet and said tank of bituminous material when said valve is closed.

3. Apparatus for dispensing and measuring melted bituminous material which comprises a tank, means for introducing melted bituminous material into said tank, an outlet pipe extending downwardly into said tank having a mouth adjacent the lowermost portion thereof, a hollow member extending downwardly into said tank which is open adjacent the lower end thereof and which is adapted to build up air pressure therein when said tank is filled with melted bituminous material, indicating means associated with said hollow member adapted to indicate by recording the air pressure in said hollow member the volume of melted asphalt in said tank above the mouth of said outlet pipe, means for introducing air under pressure into said tank to expel melted bituminous material through said outlet, and valve means for shutting off said indicating means from the air pressure in said hollow member when melted bituminous material is being expelled from said tank by air pressure.

4. Apparatus for dispensing and measuring melted bituminous material which comprises a tank, means for introducing melted bituminous material into said tank, an outlet for said tank, a float in said tank, a vertically extending rod attached to said float and passing through an aperture in said tank, means for limiting the movement of the rod to substantially longitudinal movement, means associated with said rod for indicating the level of melted bituminous material contained in said tank, means for clamping and unclamping said rod in substantially airtight relation to said tank, and means for introducing air under pressure into said tank and for expelling melted bituminous material from said tank through said outlet by pressure of air admitted into said tank.

5. Apparatus for dispensing and measuring melted bituminous material which comprises a reservoir adapted to maintain bituminous material in a melted condition, a tank, a continuous pipe adapted to withdraw melted bituminous material from said reservoir and return melted bituminous material thus withdrawn to said reservoir, means for continuously circulating melted bituminous material in said pipe, a by-pass leading from said pipe to said tank, a valve in said by-pass adjacent said pipe adapted to be opened and closed without interrupting circulation of melted bituminous material in said pipe, means for heating bituminous material in said tank, means for dispensing responsive to air pressure melted bituminous material from said tank, and means for indicating the quantity of melted bituminous material transferred from said reservoir to said tank.

6. Apparatus for dispensing and measuring melted bituminous material which comprises a reservoir adapted to maintain bituminous material in a melted condition, a tank, a continuous pipe adapted to withdraw melted bituminous material from said reservoir and return melted bituminous material thus withdrawn to said reservoir, means for continuously circulating melted bituminous material in said pipe, a by-pass leading from said pipe to said tank, a valve in said by-pass adjacent said pipe adapted to be opened and closed without interrupting circulation of melted bituminous material in said pipe, means for discharging bituminous material from the portion of said by-pass between said valve and said tank, an outlet pipe extending downwardly into said tank having a mouth adjacent the lowermost extremity of said outlet pipe, means for heating bituminous material in said tank which means is located below the mouth of said outlet pipe, means for introducing air under pressure into said tank to expel melted bituminous material through said outlet pipe when said valve in said by-pass is closed, and means for indicating the level of melted bituminous material in said tank.

WILLIAM BURCHENAL.